(12) United States Patent
Calandrino et al.

(10) Patent No.: US 8,847,973 B2
(45) Date of Patent: Sep. 30, 2014

(54) AUTOMATIC ADJUSTMENT OF COMPUTER INTERFACE COLORS USING IMAGE PROCESSING

(75) Inventors: John Calandrino, Bothell, WA (US); Rick Duncan, Kirkland, WA (US); Kyle Beck, Redmond, WA (US); Sanjeev Verma, Seattle, WA (US); David Perry, Lynnwood, WA (US)

(73) Assignee: Microsoft Corporation, Redmond, WA (US)

( * ) Notice: Subject to any disclaimer, the term of this patent is extended or adjusted under 35 U.S.C. 154(b) by 313 days.

(21) Appl. No.: 12/968,394

(22) Filed: Dec. 15, 2010

(65) Prior Publication Data

US 2012/0154420 A1 Jun. 21, 2012

(51) Int. Cl.
*G09G 5/02* (2006.01)
*G06K 9/00* (2006.01)
*G09G 5/00* (2006.01)
*G06F 15/00* (2006.01)

(52) U.S. Cl.
CPC .. *G09G 5/02* (2013.01); *G06K 9/00* (2013.01); *G06F 15/00* (2013.01); *G09G 5/00* (2013.01)
USPC ........... 345/593; 345/589; 345/581; 345/642; 345/643

(58) Field of Classification Search
USPC ................. 345/593, 589, 581, 642, 643, 591
See application file for complete search history.

(56) References Cited

U.S. PATENT DOCUMENTS

| 6,445,400 | B1 | 9/2002 | Maddalozzo et al. |
| 6,518,981 | B2 * | 2/2003 | Zhao et al. ................. 715/764 |
| 6,529,202 | B2 * | 3/2003 | Wu ............................. 345/593 |
| 6,727,943 | B1 | 4/2004 | Juen |
| 6,963,425 | B1 * | 11/2005 | Nair et al. .................. 358/1.9 |
| 7,646,392 | B2 * | 1/2010 | Klassen et al. ............. 345/593 |
| 2003/0201994 | A1 * | 10/2003 | Taylor et al. ............... 345/581 |
| 2006/0066629 | A1 * | 3/2006 | Norlander et al. ......... 345/594 |

OTHER PUBLICATIONS

Martin., "Windows Vista Aero Color Transform", Retrieved at << http://www.ghacks.net/2007/05/22/windows-vista-aero-color-transform/ >>, May 22, 2007, pp. 7.

(Continued)

*Primary Examiner* — Kimbinh T Nguyen
*Assistant Examiner* — Whitney Pointe
(74) *Attorney, Agent, or Firm* — Bryan Webster; Kate Drakos; Micky Minhas

(57) ABSTRACT

A method for processing an image such as a computer wallpaper identifies a characteristic color representative of the image. Image pixels with similar colors are separated into groups, and the average value of the R,G,B color components in each group is determined, after filtering out pixels with R,G,B values representing white, black, or grey. The group with the maximum difference between the highest average color component value and the lowest average color component value is identified as the characteristic color. Groups representing a number of pixels less than a certain percentage of all of the pixels are not considered. The characteristic color can be used in other displayed images at an intensity α determined by setting maximum and minimum values of α, with α being the lesser of $\alpha_{max}$ and $\alpha_{min}$ plus the average color span of all pixels in the image.

20 Claims, 4 Drawing Sheets
(3 of 4 Drawing Sheet(s) Filed in Color)

(56) References Cited

OTHER PUBLICATIONS

Leblanc, Brandon., "Shuffle your Desktop Backgrounds in Windows 7", Retrieved at << http://windowsteamblog.com/windows/b/windowsexperience/archive/2009/01/13/shuffle-your-desktop-backgrounds-in-windows-7.aspx >>, Jan. 13, 2009, pp. 12.

"How to Use Windows 7 Themes on Windows XP and Vista", Retrieved at << http://valuewiz.blogspot.com/2009/12/how-to-use-windows-7-themes-on-windows.html >>, Dec. 1, 2009, pp. 4.

Gouet, et al., "Object-based Queries using Color Points of Interest", Retrieved at << http://citeseerx.ist.psu.edu/viewdoc/download?doi=10.1.1.13.9760&rep=rep1&type=pdf >>, IEEE Workshop on Content-Based Access of Image and Video Libraries, 2001, pp. 7.

Lombeyda, et al., "Interactive Extraction of High-Frequency Aesthetically-Coherent Colormaps", Retrieved at << http://www.geometry.caltech.edu/pubs/LD03.pdf >>, Visualization 2003 Submission. ID #529, Seattle, Washington, Oct. 19-24, 2003, pp. 7.

"Create a Custom Desktop Theme in 7 Easy Steps", Retrieved at << http://www.microsoft.com/windows/explore/create-your-own-desktop-theme.aspx >>, Retrieved Date: Sep. 21, 2010, pp. 2.

"Changing Display Settings, Background Image, Icons, and Screen Saver in Windows Vista", Retrieved at << http://h10025.www1.hp.com/ewfrf/wc/document?lc=en&dlc=&cc=us&docname=c00839740 >>, Retrieved Date: Sep. 22, 2010, pp. 1-8.

* cited by examiner

AUTOMATIC ADJUSTMENT OF COMPUTER INTERFACE COLORS USING IMAGE PROCESSING

BACKGROUND

A typical graphical user interface for controlling a computer processor employs a display component such as a computer monitor that displays discrete areas with control features with which a user can interact by manipulating input components such as a pointing device (a mouse) and/or a keyboard. When no discrete area is present, the majority of the display screen is often called "wallpaper," and forms a background that may bound such areas when they are displayed.

The entire display area of the monitor is sometimes referred to as a "desktop," and typically includes a colored controlling bar area proximate to one edge of the desktop and bounded by the wallpaper on one side. The controlling bar can be used for various functions, such as launching an application by initiating the display of a discrete area with the control features for that application. These areas typically include a colored border region, usually at the top, and are often displayed at least partially bounded by the wallpaper. In addition to control areas, the computer processor also from time to time causes the display on the monitor of message boxes such as dialog boxes, warnings, and other messages with colored regions. The message boxes can also be at least partially bounded by the wallpaper. This graphical user interface paradigm is widely used by computer operating system modules of various providers.

In a typical such operating system, the user can choose the image to be used as the wallpaper, and also can change the wallpaper image from time to time to suit his or her particular tastes. Wallpapers can be prestored in the computer as supplied to the user, or be based on an image such as a photograph stored on the computer by the user. Wallpapers can even be a succession of images that change at a predetermined interval ("slideshow").

When a user changes the wallpaper on the monitor, a "glass color" associated with the borders, the controlling bar, and the messages discussed above may no longer provide a pleasing image when set against the wallpaper background. The user can change those colors manually, although it takes a certain amount of manipulation to do so and often involves sonic trial and error to find a color that is compatible with the new wallpaper. For a wallpaper that comprises a slideshow, though, the user would heretofore probably select a relatively neutral color that would be expected to be compatible with all of the backgrounds making up the slideshow.

SUMMARY

One aspect of the subject matter discussed herein provides a manner of automatically changing a color or other attribute associated with a display area, controlling bar, and messages so that the attribute is compatible with a new wallpaper.

It will be appreciated that while glass color is one of the attributes that can be based on a characteristic color of the wallpaper, other attributes of the graphical user interface can be manipulated, as well. For example, font types and font colors for displaying text elements, including those in the display areas, controlling bar and messages can also be changed in accordance with the characteristic color. This list of attributes is not meant to be limiting, and many others can be changed in accordance with a characteristic color determined as broadly described herein, such as the color of drop shadows and/or text colors associated with icons displayed on a computer monitor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The objects of the subject matter discussed herein will be better understood from the detailed description of embodiments which follows below, when taken in conjunction with the accompanying drawings, in which like numerals and letters refer to like features throughout. The following is a brief identification of the drawing figures used in the accompanying detailed description.

FIGS. 1A and 1B are not drawn to the same scale.

One skilled in the art will readily understand that the drawings are schematic in many respects, but nevertheless will find them sufficient, when taken with the detailed description that follows, to make and use the claimed subject matter.

DETAILED DESCRIPTION

In the detailed description that follows below, a Windows® operating system is used as one example of an operating system module that can incorporate the principles discussed herein. Terms used to describe elements of such a system, and of the user interface, are used herein for simplicity of reference. For example, the discrete control display areas mentioned above are referred to as "windows," the controlling bar is referred to as the "taskbar," and borders such as title bars of the windows and message boxes, and the taskbar, are referred to collectively as the "glass." It will be appreciated that using these terms herein does not limit the claimed subject matter to use with Microsoft Windows® operating system software and its associated user interface.

Figure 1A:
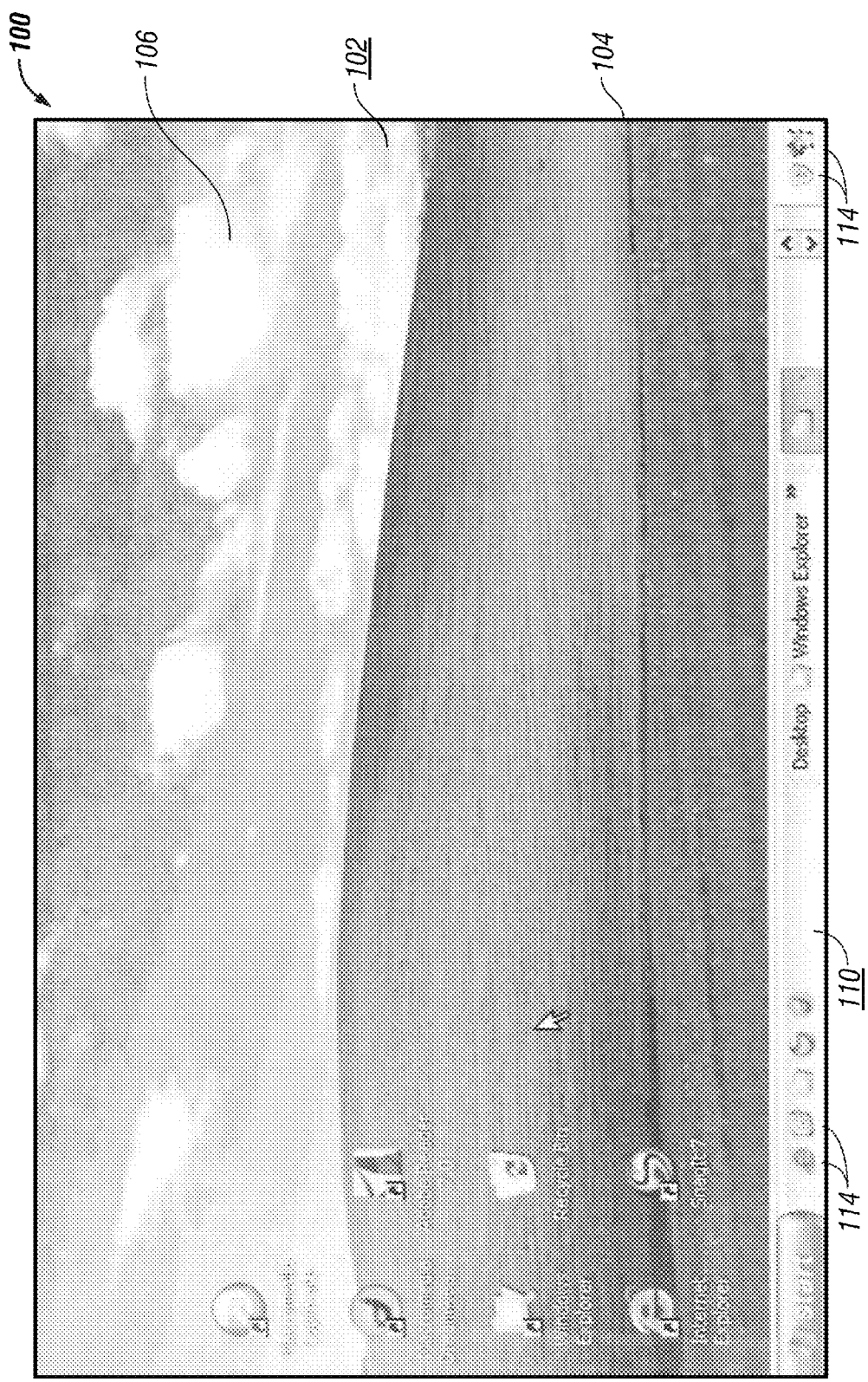
FIG. 1A depicts a computer display component displaying a background on which discrete areas and other messages can be displayed for operating the computer.

FIG. 1A is a depiction of a screen 100 of a computer monitor display module with a multicolor background comprising a photograph or illustration of a landscape 102. It will be clear that the wallpaper can be any color image. The bottom portion of the landscape is grass 104 with many gradations of green. The sky 106 is made up of various shades of blue, with clouds that are generally white, although they also have a variety of gradations of color. The bottom border of the display screen is occupied by the taskbar 110 that has an associated color and regions with icons 114 that control various functions of the computer processor. As noted above, FIG. 1A depicts a known paradigm for a graphic user interface, and the display screen 100 in FIG. 1A is sometimes called a desktop, with the landscape image 102 being called wallpaper. The taskbar 110 is bounded on one side by the wallpaper.

Figure 1B:
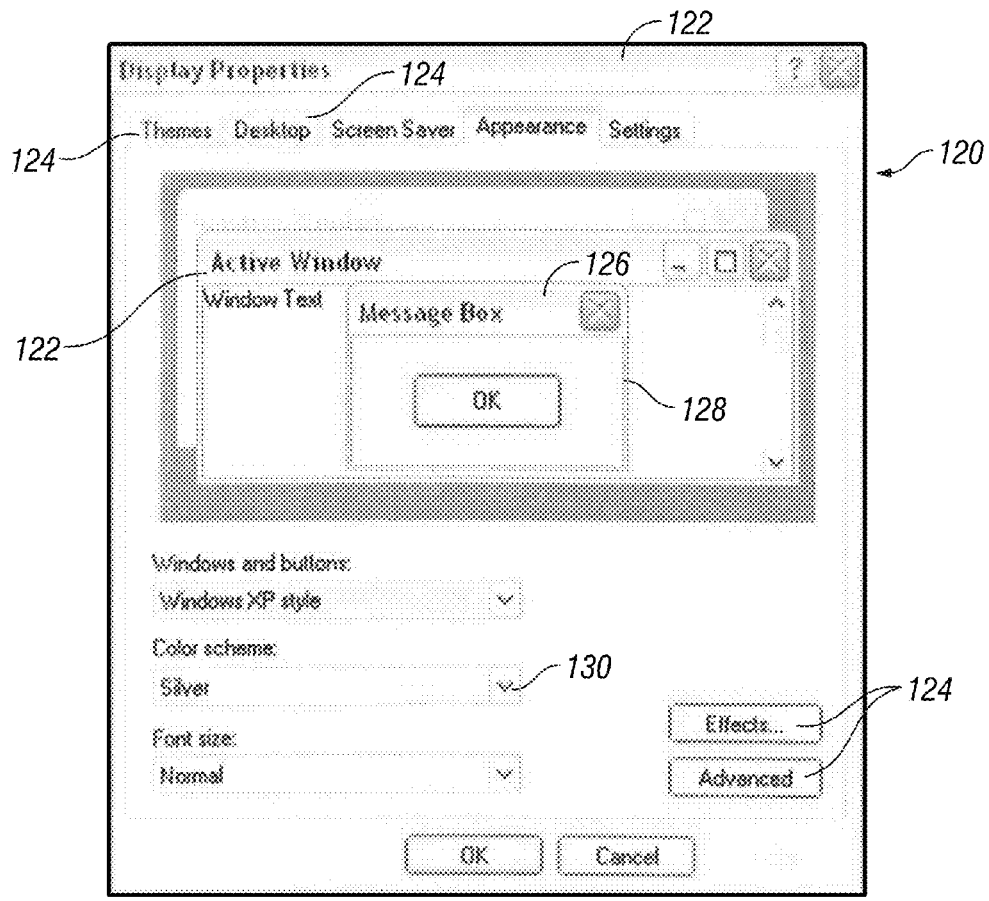
FIG. 1B depicts one type of discrete area that would be displayed on the background in FIG. 1A and shows an example of a message box.

FIG. 1B depicts a discrete control area 120 that can be displayed on the desktop to control other functions of the computer. This area, often called a "window," typically has a colored title bar 122 at the top of the window and, in some user interfaces, a colored border about four or so pixels wide around the rest of the window. The window 120 permits various functions to be performed by pointing a cursor (not shown) directed by a user using input components such as a pointing device sometimes referred to as a mouse (also not shown in FIG. 1) at controlling areas 124 within the window 120. The particular window 120 can be displayed to specify characteristics of the display such as the color of the title bar 122 on windows the user opens while using the computer and the color of the title bar 126 on message boxes 128 that the computer processor generates during use to communicate with the user. Windows and message boxes represent areas that can be displayed on the desktop at least partially bounded by the wallpaper image. The taskbar and the various title bars are typically the same color, sometimes called the "glass color." It will be understood that regions of other displayed items, such as text associated with the icons 114, can be included in the glass and have the same color. The regions specifically discussed here are meant only as examples of regions to which the disclosed principles can be applied.

As already mentioned, FIGS. 1A and 1B depict a user interface conventionally used by a Microsoft Windows XP® operating system module stored on a non-transitory computer-readable storage device as encoded computer executable instructions for controlling the display on a computer display component of a color background image and attributes of other images as discussed above. These instructions, when executed by a processor, cause the computer to perform according to the method embodiments described herein. This, however, should in no way be taken as limiting the claimed subject matter to any particular operating system, whether it is a particular version of a Windows® operating system module or that of other operating systems using software of other providers or users. Those skilled in the art will recognize that the concepts and methods described herein for automatically changing glass color or other attributes of a graphical user interface component are equally applicable to any operating system that uses a paradigm like that discussed in connection with FIGS. 1A and 1B to provide such an interface.

Referring now more particularly to FIG. 1B, the window 120 permits a user to manually chose a glass color scheme using a drop-down menu that will display a variety of color choices by using a mouse to click on the arrow 130 associated with the notation "Color scheme." This is one conventional way for a user to choose a glass color. To implement the method discussed below, one of the choices displayed in the drop-down menu can be "Automatic," thus invoking the method described herein of automatically matching the glass color to the wallpaper whenever the latter changes, whether manually by user input, or in a slideshow mode in which a series of images are displayed at predetermined intervals, it will be understood that the manner of choosing a glass color can vary with different operating system modules. For example, a Microsoft Windows 7® operating system module displays color swatches from which a user can select a glass color from after choosing a menu item named "Window Color and Appearance" (not shown in the figures). One of the color swatches could be named "Automatic," thus invoking the automatic color selection discussed herein. To repeat, the specific manners of invoking automatic attribute selection discussed herein are intended only as examples of how a user can initiate the methods described herein, which are not limited to use with any particular operating system module.

Figure 2:
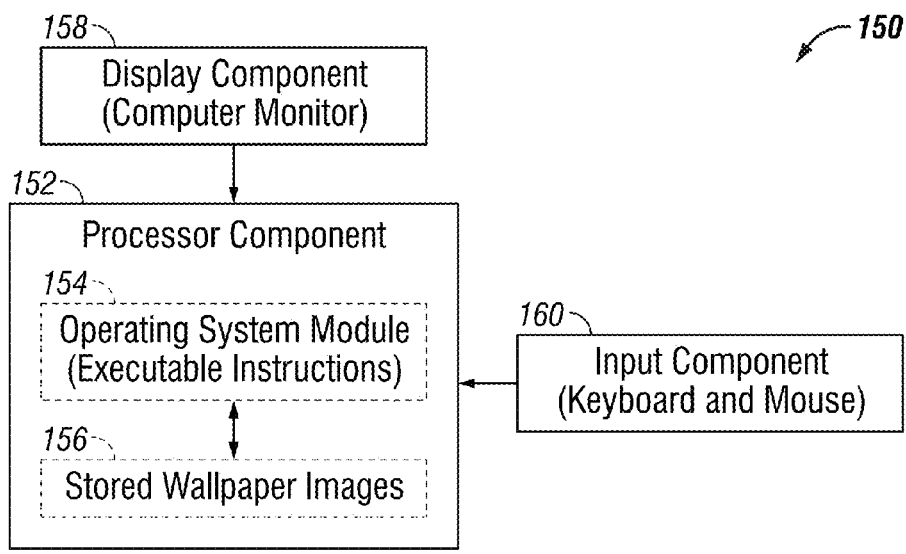
FIG. 2 is a schematic block diagram of a computer system suitable for implementing methods discussed herein.

FIG. 2 illustrates schematically a computer system 150 that can display the images shown in FIGS. 1A and 1B, and also carry out the methods to be discussed further below in connection with FIGS. 3 and 4. The system comprises a processor component 152 that includes an operating system module 154. The operating system module is typically stored on a non-transitory storage device such as a hard drive (not shown), and is embodied in computer executable instructions that are executed by the processor component 152, as noted above. The hard drive component also includes stored images that the operating system module causes to be displayed as wallpaper on a display module 158, such as a computer monitor. The system 150 also includes an input component 160, which in a typical implementation will comprise a conventional pointing device such as a mouse and a keyboard, although many other input components could be used, such as a touch screen activated by a user's hand or a pen, voice commands, and the like. As discussed above, the wallpaper can be changed by a user of the computer system 150 using the mouse and/or the keyboard in an appropriate setting.

As used in this description, the terms "component," "module," "system," "apparatus," "interface," or the like are generally intended to refer to a computer-related entity, either hardware, a combination of hardware and software, software, or software in execution, unless the context clearly indicates otherwise (such as the use of the term "color component" hereinbelow). For example, such a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disc, floppy disc, magnetic strips . . . ), optical discs (e.g., compact disc (CD), digital versatile disc (DVD) . . . ), smart cards, and flash memory devices (e.g., card, stick, key drive . . . ). Of course, those skilled in the art will recognize many modifications may be made to this configuration without departing from the scope or spirit of the claimed subject matter. Moreover, the term "computer" is not meant to be limiting in any manner. For example, the claimed subject matter can be embodied in any suitable apparatus, including desktop computers, laptops computers, personal digital assistants, smart phones, televisions, and the like.

Figure 3:
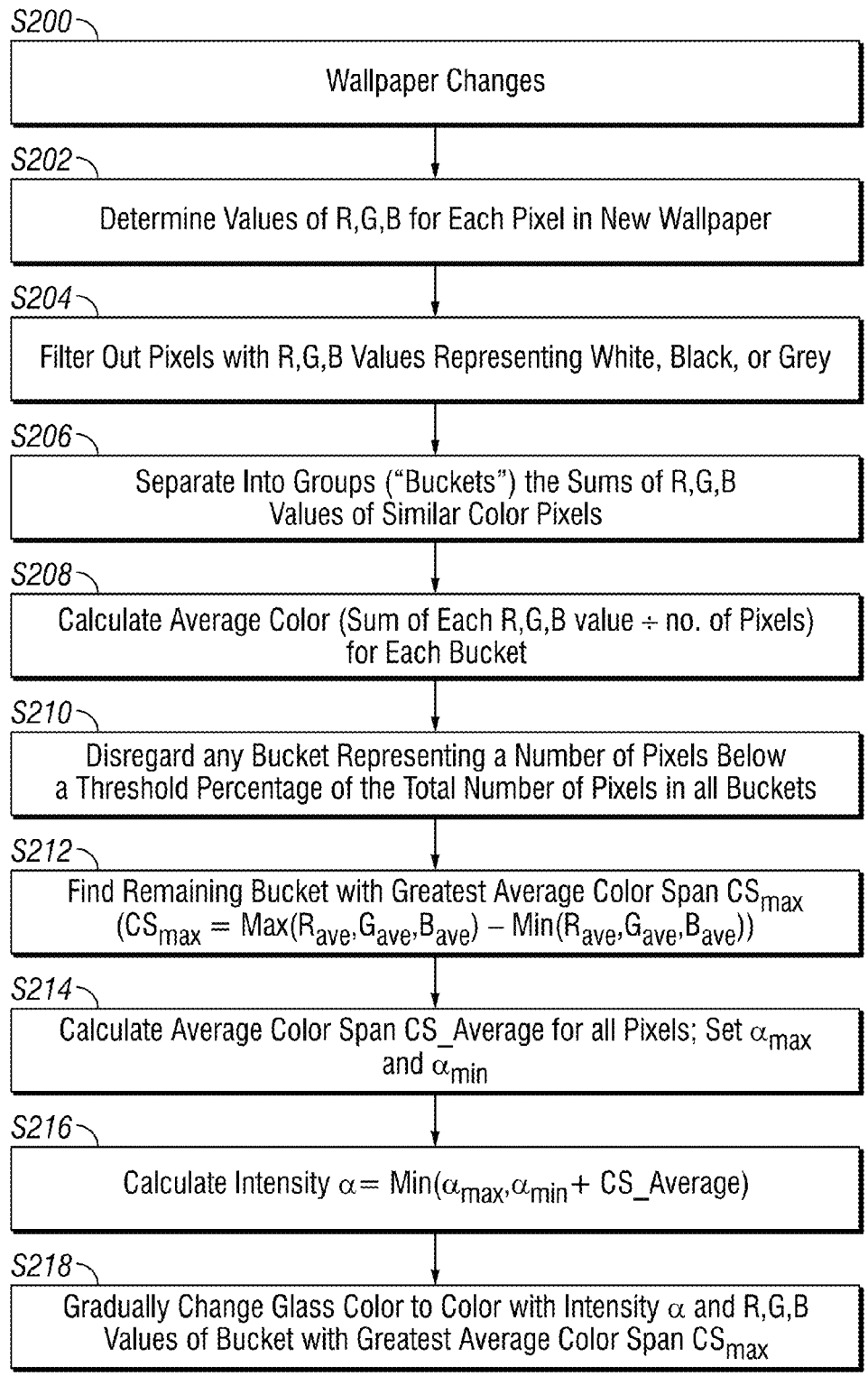
FIG. 3 is a schematic flowchart showing one embodiment of a method for changing the glass color based on a change of the wallpaper currently being displayed.
Figure 4:
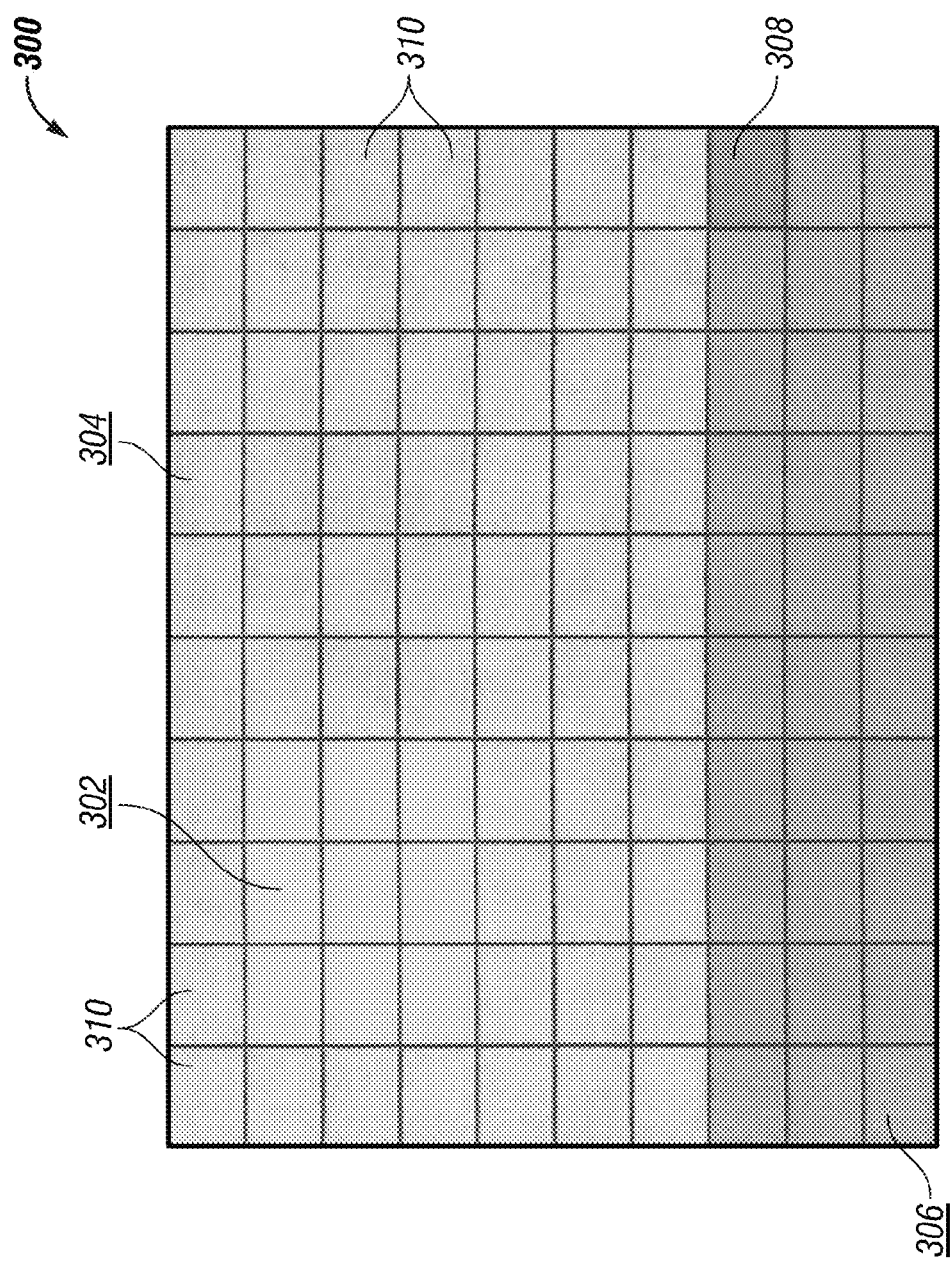
FIG. 4 schematically depicts the pixels of a particular image and illustrates how the method shown in FIG. 3 selects a characteristic color of this image.

FIG. 3 is a flowchart of an image processing method that automatically selects a characteristic color of an image, such as the wallpaper 102 on the computer monitor screen 100. This embodiment identifies for use as a glass color a focal color of the wallpaper rather than just a dominant background color. Other embodiments could involve identifying more than one color, or further identifying one or more complementary colors with sufficient contrast to use as a font color against a focal color (such as a text color for a window title bar in the focal color). As one example, the focal color could be determined as described herein, with the complementary color having the same hue but different saturation/brightness so that it becomes either off-white or off-black depending on which would provide the most contrast with the focal color. The focal color is, in any event, chosen to provide a glass color that gives the most pleasing appearance when displayed against the wallpaper, since many times windows 120 and message boxes 128 do not occupy the entire area of the wallpaper. This method enables automatic determination of a characteristic color of the wallpaper in a sufficiently short time that the glass color change does not lag behind the wallpaper change, so that the glass color and the wallpaper can change synchronously, (That is, as the new wallpaper fades in the glass color changes incrementally from the old color to the new color.) The method of the present embodiment begins at step S200 when the computer detects that the wallpaper has changed and the automatic glass color change feature is enabled as discussed above.

In step S202 all of the pixels in the new wallpaper image are sampled for their red, green, and blue values. Step S204 filters out pixels with R, G, and B values indicating colors close to black, white or grey on the assumption that they are usually considered unsuitable as a glass color. (A user could manually set a constant glass color of black, white, or a shade of grey for use with all wallpapers, in which case providing for automatically changing the glass color with changes in wallpaper is unnecessary.) The color values of the pixels filtered out in step S204 are used later (see step S214 below). If this step results in filtering out all pixels (which would be the case if the wallpaper were a black-and-white image), the process would terminate and the algorithm would set the glass color to a predetermined shade, such as light grey.

Step S206 creates groups, called "buckets" herein, from pixels of similar colors. In one embodiment, steps S202, S204, and S206 are performed together; that is, as each pixel is sampled in step S202, it is determined if it is close to black, white or grey. If not it is placed in a bucket in accordance with the following description. In any event, the range of component color values defining two pixels as being similar in color is somewhat arbitrary. Step S206 of the present embodiment uses the values assigned to each of the red, green, and blue components of a non-filtered pixel, typically expressed as (R,G,B), with each of R, G, and B being assigned a value within a predetermined range, which in the present embodiment is 0 and 255. Then, if a first pixel has a color value $(R_1,G_1,B_1)$, a second pixel with a color value $(R_2,G_2,B_2)$ will be deemed to be a similar color when the pairs $R_1$ and $R_2$, $G_1$ and $G_2$, and $B_1$ and $B_2$ have values within a predetermined segment of the total range of values. For example, if the total range of color component values is S (in the present embodiment S=256), it can be divided considered as having "x" number of segments. If the number of segments x=4 (as an example), and the segments are chosen to be equal, then segment one would be the first quarter of S (0 to 63), segment two would be the second quarter of S (64 to 127), segment three would be the third quarter of S (128 to 191), and segment four would be the fourth quarter of S (192 to 255), So, two pixels with the color values $(R_1,G_1,B_1)$ and $(R_2,G_2,B_2)$ are deemed to be similar in color if the pair $R_1$ and $R_2$ is within a particular segment, the pair $G_1$ and $G_2$ are within a particular segment, and the pair $B_1$ and $B_2$ are within a particular segment. Note that each pair can be in a different segment.

It will be appreciated from the manner in which the image is mapped into the groups or buckets that the pixels themselves are not stored in the present embodiment, Rather, a cumulative sum of each R, G, and B value is calculated for all pixels of similar color (as defined above), and a count is kept of the total number of such pixels. When all pixels in the image have been sampled, step S208 calculates the average R, G, and B value for the contents of each bucket by dividing the sum of all of the R, G, and B values by the number of pixels represented in that bucket. The result is the average color of each bucket, which can be considered the representative color of the bucket. This approach substantially reduces processing time as compared to a method that depends on storing color values for each individual pixel. This will reduce the time required to perform the color processing according to the present method to acquire a glass color with the desired characteristics. However, those skilled in the art will appreciate that the pixels can be separated into buckets in ways other than that described in the present example. It will also be appreciated that the bucket's representative color can be determined in other ways, as well. For example, the value of each component of a bucket's representative color could be the median of all of the values for each color component of all of the pixels in the bucket instead of the average value as in the present embodiment.

Step S210 eliminates from further consideration any bucket that does not represent a number of pixels comprising at least a certain percentage of the total number of pixels represented by all of the buckets. This threshold percentage is imposed to ensure that a bucket represents enough pixels to be perceived by a viewer as a focal color of the wallpaper image. It has been found that 1% is a suitable threshold percentage in most cases. Stated another way, if a particular bucket does not represent at least 1% of the total number of pixels represented in all of the buckets, that bucket is not used in the next step S212.

Step S212 identifies from the remaining buckets the bucket for which the average color represented by the pixels in that bucket (calculated in step S208) is the brightest color of all of the buckets. First, the color span (CS) for each bucket is determined by calculating the difference between the maximum red, green, or blue average value and the minimum red, green, or blue average value, represented mathematically by the formula $CS=\max(R_{ave},G_{ave},B_{ave})-\min(R_{ave},G_{ave},B_{ave})$. As an example, consider a bucket in which $R_{ave}=221$, $G_{ave}=250$, and $B_{ave}=12$. The color span would be CS=238 $(G_{ave}-B_{ave})$. The bucket with the highest average color span value $CS_{max}$ (the brightest color represented by all of the buckets) is deemed the characteristic color of the image and selected as the glass color. It is believed that an image color in which one or two of the component color values is high and the others are low is perceived by the human eye as a bright color comprising the focal point of the image.

Next, the intensity α of the glass color is specified. Here, the concept is to tune the glass color intensity in relation to the overall brightness or vibrancy of the wallpaper image. For example, a lower value of α is more appropriate for generally darker, less vibrant wallpaper images, since a high intensity glass color would be perceived by a viewer as having too much contrast relative to the wallpaper. Nonetheless, a minimum value for α is set so that the glass color is perceivable by a viewer. Conversely, bright wallpaper images would have a higher value of α so that the glass color is distinguishable from its background. A maximum value of α is also specified to prevent the glass color from dominating the viewer's perception of the display.

In this embodiment, step S214 illustrates the first part of determining α, namely by finding the average color span CS_average of all of the pixels in the wallpaper image (color and non-color). CS_average can be calculated in a number of ways. Here, the color span of each pixel in the wallpaper image is calculated and summed, and the sum is divided by the total number of pixels in the wallpaper image. Minimum and maximum values of α are set at percentages of the maximum possible range S of α (S=256 in the present example). It has been found that for a range of α values of 256, good results are achieved with the percentage used for $α_{min}$ set at 37.5% and the percentage used for $α_{max}$ set at 75%. Step S216 calculates α as the lesser of $α_{max}$ and $α_{min}$+CS_average. This calculation is represented mathematically by the formula α=min($α_{max}$,$α_{min}$+CS_average).

The method is completed in step S218 by gradually changing the glass color from the existing color to the new color $CS_{max}$, with an intensity α. As noted above, in a preferred embodiment the change from the existing glass color (and intensity) to the new glass color (and intensity) will occur synchronously with the gradual wallpaper image change. Typically, the existing glass color will have a specified transparency, which is left unchanged.

From this description, it will be appreciated that in a general sense, the disclosed subject matter relates to a method for processing a color image comprising a plurality of pixels, each having color components represented by numerical values, to identify a characteristic color representative of the image, the method including separating into groups the numerical values of the color components of pixels with similar colors, determining for each group a representative color having color component values based on the color component values of pixels represented by the group, selecting from the representative colors of all of the amps a color that is characteristic of the color image; and displaying on a display component as the characteristic color a color having the color component values of the selected representative color.

A more specific example will illustrate the application of the embodiment of the method described further above in connection with FIG. 3 to a particular image. FIG. 4 illustrates a schematic color image 300 represented as a 10×10 grid of pixels 310 with four regions having different colors. For simplicity of description, all of the (R,G,B) values of pixels in a region are the same. Region 302 is bright yellow, which are grouped into a bucket representing nine pixels with (R,G,B)=(245,245,0). The color span CS for the region 302 is thus 245. A region 304 is blue and is represented by a bucket of 61 pixels with R, G, and B values providing a color span less than 245. A region 306 is green and is represented by a bucket of 29 pixels with R, G, and B values also providing a color span less than 245. The chosen difference in color values defining similar colors results in a fourth region 308 that is bright green and is represented by a bucket of one pixel for which (R,G,B)=(0,255,255). The color span CS for the region 308 is therefore 255. Using a threshold percentage as discussed above (see step S210) of 2% eliminates the color of the region 308 as the glass color, even though it has the greatest color span of all of the regions. Accordingly, the color of the region 302 is selected for the glass color $CS_{max}$.

The intensity α of the glass color is calculated using the above formula α=min($α_{max}$,$α_{min}$+CS_total). For the image 300, $α_{max}$=192 (75% of 256), and $α_{min}$=96 (37.5% of 256). If the (R,G,B) values of all of the pixels are such that CS_average=70, then the intensity α of the glass color will be 166 (96+70). The old glass color associated with a previous image (not shown) fades to the new glass color with (R,G,B)=(245, 245,0), or the color of the region 302, with an intensity α of 166. As noted above, the transparency of the new glass color is typically the same as that of the previous glass color.

It will be appreciated that the method can be adapted to automatically set other attributes of windows or other features displayed by an operating system. As one example, the image processing techniques discussed above could be used to identify an image with a certain number of buckets having average color spans above a predetermined threshold. Such an image would be perceived by the human eye as vibrant and high-energy. Fonts or other attributes used in windows and message boxes could be chosen depending on the number of buckets with average color spans above the threshold. Likewise, font colors could be chosen to provide maximum contrast with the wallpaper image. These fonts and font colors could be also applied to the text associated with icons on the desktop, as shown in FIG. 1A. In short, image processing according to this aspect of the subject matter discussed herein can be used to determine attributes applicable to many different aspects of the image shown on the display module.

Other variations are also possible. In one such variation the rate of change from the old glass color/intensity or attributes such as those discussed above (or others, including any change in items being displayed) could change based on characteristics of $CS_{max}$. For example, if $CS_{max}$ were a "warm" color such as red, yellow, or orange, the transition could be made faster than if $CS_{max}$ were a "cool" color such as blue or green. Other adaptations could be made for wallpaper images displayed across multiple monitors. Such a variation would involve analyzing the image on each monitor as described above, but with the extra step of filtering out buckets that do not contain at least 1% of the pixels of each image. Once the remaining buckets are thus identified, the pixels in each bucket across all images are averaged in accordance with the above description. The intensity α would be computed by considering all pixels in all of the wallpaper images. All of the images would use the same glass color.

In addition, a characteristic color of one or more portions of an image could be determined using principles described above. For example, a known algorithm could be used to determine if the image includes a human face, with the characteristic color as defined above chosen in accordance with an eye color, whereby the glass color or other attribute would be set accordingly. Yet another variation would use a known algorithm to identify any particular portion of an image with certain properties, and then perform a method such as that discussed herein to identify a characteristic color of that portion of the image.

Unless specifically stated, the methods described herein are not constrained to a particular order or sequence. In addition, some of the described method steps can occur or be performed concurrently. Further, the word "example" is used herein simply to describe one manner of implementation. Such an implementation is not to be construed as the only manner of implementing any particular feature of the subject matter discussed herein. Also, functions described herein as being performed by computer programs are not limited to implementation by any specific embodiments of such programs.

Although the subject matter herein has been described in language specific to structural features and/or methodological acts, it is to be understood that the subject matter of the appended claims is not limited to the specific features or acts described above. Rather, such features and acts are disclosed as sample forms of corresponding subject matter covered by the appended claims.

What is claimed is:

1. A method for processing a color background image comprising a plurality of pixels, each having color components represented by numerical values, to identify a characteristic color representative of the image, and for automatically adjusting at least one attribute of at least one other image at least partially bounded by the color background image, the method including:
separating into groups the numerical values of the color components of pixels with similar colors;
determining for each group a representative color having color component values based on the color component values of pixels represented by the group;
selecting from the representative colors of all of the groups a color that is characteristic of the color background image; and
automatically and gradually adjusting at least one attribute of the at least one other image based on the selected color that is characteristic of the color background image, to display on a display component, the at least one other image adjusted based on the selected color that is characteristic of the color background image,
wherein the method is initiated whenever a change of the color background image occurs,
wherein the change of the color background image and the adjusting of at least one attribute of the at least one other image occur synchronously, and
wherein at least one attribute of the at least one other image fades from a previous attribute to the automatically adjusted attribute.

2. A method as in claim 1, wherein:
the representative color of a group is determined using a predetermined algorithm that uses the values of the respective color components of the pixels represented by the group; and
the representative color with the greatest difference between the highest color component value and the lowest color component value is selected as the characteristic color.

3. A method as in claim 2, wherein groups representing a number of pixels less than a threshold percentage of all of the pixels represented in all of the groups are not considered in the selecting step.

4. A method as in claim 2, wherein pixels with color component values representing white, black, or grey are not considered in the determining step.

5. A method as in claim 2, wherein each color component value of the representative color comprises the average value of each color component in a group, the average value being determined by summing the total value of each color component for all pixels represented in the group and dividing the sum by the number of pixels represented in the group.

6. A method as in claim 5, wherein each pixel has an R (red), G (green), and blue (B) color component, each color component having a numerical value within a predetermined range of values, and two pixels are deemed to have a similar color if each of their respective R, G, and B values are within a predetermined segment of the range.

7. A method as in claim 5, wherein the predetermined range is a particular segment of the total range of color values between 0 and 255, and groups with average R, G, and B values representing white, black, or grey are not considered in the selecting step.

8. A method as in claim 7, wherein groups representing a number of pixels less than a threshold percentage of at least 1% of all of the pixels represented in all of the groups are not considered in the selecting step.

9. A method as in claim 8, further including displaying the characteristic color on a computer monitor at an intensity $\alpha$ determined by:
determining the average color span (CS_average) for all pixels in the image, the color span of a pixel being the difference between the highest color component value and the lowest color component value in the pixel; and
setting a maximum value of $\alpha$ ($\alpha_{max}$) and a minimum value of $\alpha$ ($\alpha_{min}$), wherein $\alpha=\min(\alpha_{max},\alpha_{min}+\text{CS\_average})$.

10. A computer-readable storage module not consisting of a propagated signal encoded with computer executable instructions for controlling the display on a display component of a color background image and attributes of other images at least partially bounded by the background image, which instructions, when executed by a processor, cause the computer to perform the steps of:
separating into groups the numerical values of the color components of the color background image pixels with similar colors;
determining for each group a representative color having color component values based on the color component values of pixels represented by the group;
selecting from the representative colors of all of the groups a color that is characteristic of the color image, without considering pixels with color component values representing white, black, or grey;
assigning to the other images at least one attribute based on the selected representative color; and
automatically and gradually adjusting the at least one attribute of the other images based on the selected color that is characteristic of the color background image, to display on a display component, the at least one other image adjusted based on the selected color that is characteristic of the color background image,
wherein the recited steps are initiated whenever a change of the color background image occurs,
wherein the change of the color background image and the adjusting of at least one attribute of the at least one other image occur synchronously, and
wherein at least one attribute of the at least one other image fades from a previous attribute to the automatically adjusted attribute.

11. A storage device as in claim 10, wherein the attribute comprises at least a color or a font associated with the other images.

12. A storage device as in claim 10, wherein:
the representative color of a group is determined using a predetermined algorithm that uses the values of the respective color components of the pixels represented by the group; and
the representative color with the greatest difference between the highest color component value and the lowest color component value is selected as the characteristic color.

13. A storage device as in claim 12, wherein each color component value of the representative color comprises the average value of each color component in a group, the average value being determined by summing the total value of each color component for all pixels represented in the group and dividing the sum by the number of pixels represented in the group.

14. A storage device as in claim 10, wherein each pixel has an R (red), G (green), and blue (B) color component, each color component having a numerical value within a predetermined range of values, and two pixels are deemed to have a similar color if each of their respective R, G, and B values are within a predetermined segment of the range.

15. A storage device as in claim 14, wherein the predetermined range of color values is from 0 to 255.

16. A storage device as in claim 11, groups representing a number of pixels less than a threshold percentage of at least 1% of all of the pixels represented in all of the groups are not considered in the selecting step.

17. A method for changing a color associated with an image displayed on a display component in accordance with a characteristic color of a background comprising a plurality of pixels, each having color components represented by numerical values, which background at least partially bounds the image, the method including:
   detecting a change from an existing background to a new background;
   separating into groups the numerical values of the color components of pixels with similar colors in the new background;
   determining the average value of each color component in each group based on the number of pixels represented by the group, wherein the average value of each color component in a group is determined by summing the total value of each color component for all pixels represented in the group and dividing the sum by the number of pixels represented in the group;
   identifying the group with the maximum color span, without considering pixels with color component values representing white, black, or grey, wherein color span is defined as the difference between the highest average color component value and the lowest average color component value in the group; and
   changing the color associated with the image to a color having the average color component values of the group with the maximum color span and an intensity $\alpha$ determined by:
   determining the average color span (CS_average) for all pixels in the image, the color span of a pixel being the difference between the highest color component value and the lowest color component value in the pixel, and setting a maximum value of $\alpha$ ($\alpha_{max}$) and a minimum value of $\alpha$ ($\alpha_{min}$), wherein $\alpha=\min(\alpha_{max},\alpha_{min}+CS\_average)$.

18. A method as in claim 17, wherein:
   each pixel has an R (red), G (green), and blue (B) color component, each color component having a numerical value within a predetermined range of values between 0 and 255, and two pixels are deemed to have a similar color if each of their respective R, G, and B values are within a predetermined segment of the range; and
   groups representing a number of pixels less than a threshold percentage of at least 1% of all of the pixels represented in all of the groups are not considered in the identifying step.

19. A method as in claim 18, wherein $\alpha_{max}=192$ and $\alpha_{min}=96$.

20. A method as in claim 17, wherein each color component has a maximum possible range of values S, and $\alpha_{max}$ and $\alpha_{min}$ are set to predetermined percentages of S.

* * * * *